(12) United States Patent
Johnson et al.

(10) Patent No.: US 7,146,538 B2
(45) Date of Patent: *Dec. 5, 2006

(54) BUS INTERFACE MODULE

(75) Inventors: Tyler James Johnson, Plano, TX (US); Theodore Carter Briggs, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 542 days.

This patent is subject to a terminal disclaimer.

(21) Appl. No.: 10/402,092

(22) Filed: Mar. 28, 2003

(65) Prior Publication Data

US 2004/0193962 A1 Sep. 30, 2004

(51) Int. Cl.
*G06F 11/00* (2006.01)

(52) U.S. Cl. .................... 714/30; 714/27; 714/726; 714/727; 326/16

(58) Field of Classification Search .............. 714/717
See application file for complete search history.

(56) References Cited

U.S. PATENT DOCUMENTS

| | | | | |
|---|---|---|---|---|
| 5,109,486 | A * | 4/1992 | Seymour | 709/224 |
| 5,390,164 | A * | 2/1995 | Kremer | 370/223 |
| 5,448,588 | A * | 9/1995 | Saito | 375/224 |
| 5,862,152 | A * | 1/1999 | Handly et al. | 714/727 |
| 6,366,584 | B1 * | 4/2002 | Gulliford et al. | 370/403 |
| 6,427,217 | B1 * | 7/2002 | Hartnett | 714/733 |
| 6,480,473 | B1 * | 11/2002 | Chambers et al. | 370/253 |
| 6,640,324 | B1 * | 10/2003 | Goldovsky | 714/729 |
| 6,643,812 | B1 * | 11/2003 | Reasor | 714/727 |
| 6,779,142 | B1 * | 8/2004 | Bhavsar et al. | 714/726 |
| 2004/0114524 | A1 | 6/2004 | Depta et al. | |

FOREIGN PATENT DOCUMENTS

| | | |
|---|---|---|
| EP | 0 727 747 | 8/1996 |
| EP | 0 892 352 | 1/1999 |
| EP | 1 393 604 B1 | 9/2005 |
| GB | 2 324 943 A | 11/1998 |

OTHER PUBLICATIONS

Katz, "Multiplexer as a Logic Building Block", Contemporary Logic Design, The Benjamin/Cummings Publishing Company, Inc., 1994, pp. 185-186.*
Microsoft Press Computer Dictionary Third Edition, "register", Microsoft Press, 1997, p. 402.*
Bart Vermeulen and Sandeep Kumar Goel, "Design for Debug: Catching Design Errors in Digital Chips", IEEE Design & Test of Computers; May-Jun. 2002; pp. 37-45.
Search Report under Section 17 in GB0405429.2 from the UK Patent Office (date of search Jul. 15, 2004), 1 page.
Examination Report Under Section 18(3) from the UK Patent Office dated Jul. 28, 2005; 3 pages.

* cited by examiner

*Primary Examiner*—Gabriel L Chu

(57) ABSTRACT

A bus interface module ("BIM") connectable to a debug bus is described. In one embodiment, the BIM comprises a plurality of BIM segments connected in a ring such that an output of each BIM is connected to an input of a next BIM via the debug bus, the BIM comprising logic for receiving data from a previous BIM, logic for receiving data from local logic associated with the BIM, and logic for combining the previous BIM data with local logic data and transmitting the combined data to a next BIM.

23 Claims, 5 Drawing Sheets

BUS INTERFACE MODULE

CROSS-REFERENCE TO RELATED APPLICATIONS

This application is related to U.S. patent application Ser. No. 10/402,034, filed Mar. 28, 2003, entitled AN INTEGRATED CIRCUIT; U.S. patent application Ser. No. 10/402,628, filed Mar. 28, 2003, entitled SYSTEM AND METHOD FOR USING A DEBUG BUS AS A CAPTURE BUFFER; and U.S. patent application Ser. No. 10/402,122, filed Mar. 28, 2003, entitled SYSTEM AND METHOD FOR VERIFYING HDL EVENTS, all of which are hereby incorporated by reference in their entirety.

BACKGROUND

The increasing complexity of system designs, increased investment required due to this complexity, and shortened product cycles have presented significant challenges to post-silicon design verification of chipsets. This is especially true with respect to high-end cache coherent non-uniform memory access ("ccNUMA") chipsets where systems can be extremely large and complex. Processor post-silicon verification is typically focused on electrical verification at least as much as functional verification due to the large amount of full custom design. Chipsets present a different challenge due to the large number of cells of which they are comprised. Additionally, due to the sheer number of buses, internal bus arbitration, cache coherency control, queue arbitration, etc., in a large ccNUMA server, post-silicon functional verification of such a chipset consumes a greater amount of resources with respect to electrical verification than processors typically consume. Internal observability, while relatively simple in pre-silicon verification, poses a major obstacle to debug and functional test coverage.

Determining when system verification is complete is a second major obstacle to completing post-silicon verification in a time-effective manner. While pre-silicon simulation-based testing depends significantly on labor intensive directed and pseudo-random testing, post-silicon testing has historically depended on observing system operations that imply correct behavior.

Performing post-silicon design verification is an industry standard practice that facilitates exposure of bugs not typically uncovered in pre-silicon verification. Typical post-silicon bugs discovered include those that are manifested after long or at-speed operation of the system, those resulting due to incorrect modeling of hardware and firmware interfaces, those resulting from Register-Transfer Language ("RTL") errors that escaped pre-silicon detection, and those resulting from incorrect mapping of RTL-to-silicon (synthesis/physical bugs). Accepted methods of exercising systems to expose post-silicon bugs include running operating systems and software applications targeted for the final system, creating specific directed software tests that stress different portions of the system, and running software tests that create random system operations.

Real-time observability ("RTO") refers to the ability to monitor and capture internal signals in real time either on- or off-chip. While internal signal observability features have been available in some field programmable gate array ("FPGA") architectures and application specific integrated circuits ("ASICs"), they have typically been of limited scope. Limiting factors have been silicon area, wiring constraints, and I/O limitations. In addition, observability features have traditionally been used for debug and not functional test coverage.

SUMMARY

A bus interface module ("BIM") connectable to a debug bus is described. In one embodiment, the BIM comprises a plurality of BIM segments connected in a ring such that an output of each BIM is connected to an input of a next BIM via the debug bus, the BIM comprising logic for receiving data from a previous BIM, logic for receiving data from local logic associated with the BIM, and logic for combining the previous BIM data with local logic data and transmitting the combined data to a next BIM.

DETAILED DESCRIPTION OF THE DRAWINGS

Figure 1:
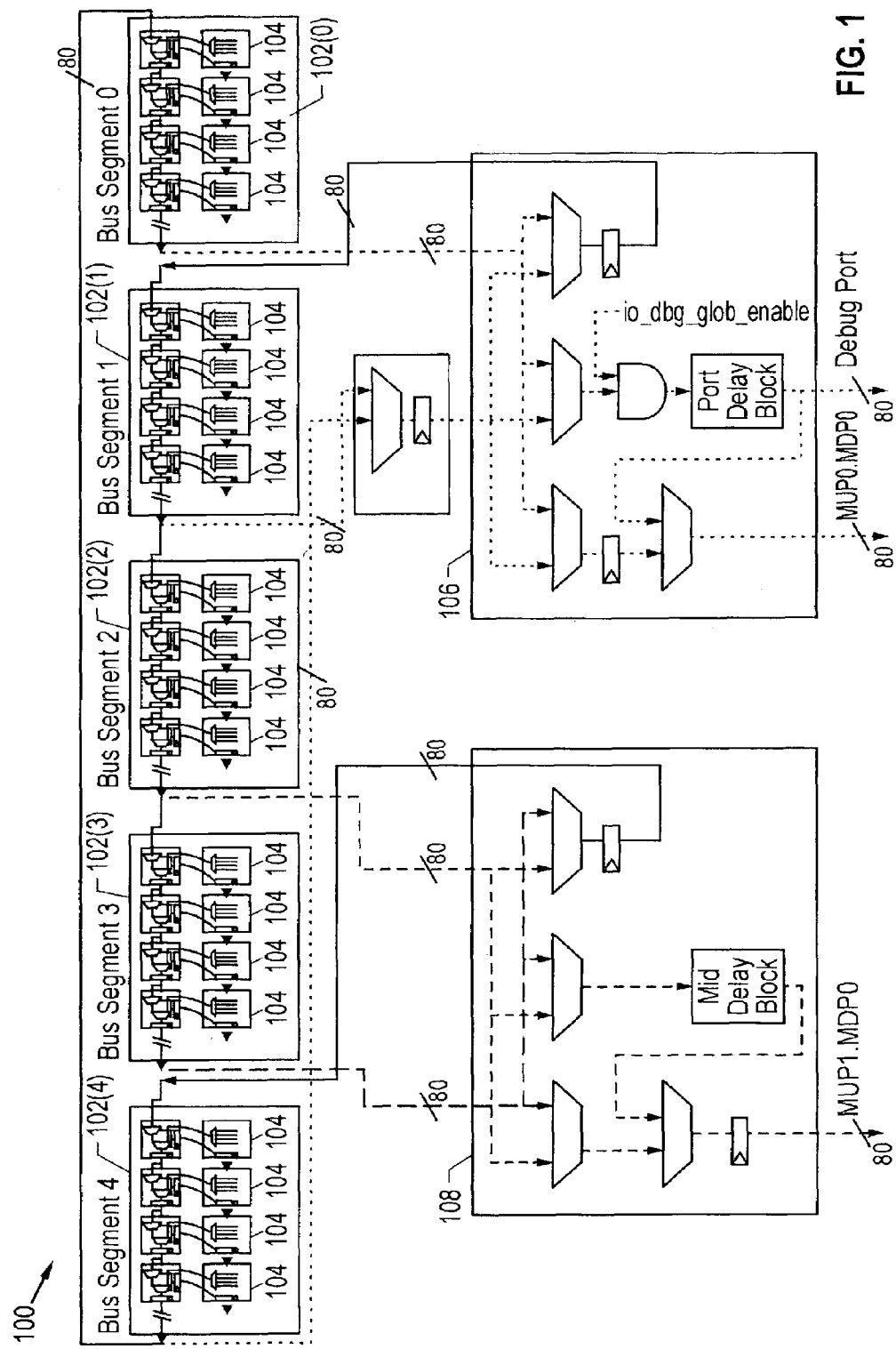
FIG. 1 is a block diagram of a debug bus of one embodiment.

In the drawings, like or similar elements are designated with identical reference numerals throughout the several views thereof, and the various elements depicted are not necessarily drawn to scale.

As illustrated in FIG. 1, in accordance with one embodiment, a debug bus 100 comprises a plurality of bus segments 102(0)–102(4) interconnected in a serial ring that runs at the core clock speed of an IC, e.g., an ASIC, in which the bus is implemented. In one implementation, the debug bus 100 is 80-bits wide; however, in general, the width of the debug bus is consistent with device pin constraints. Moreover, although the illustrated embodiment employs only five bus segments 102(0)–102(4), it will be appreciated that greater or fewer than five bus segments may be implemented as necessary for providing appropriate logical and physical partitioning.

Each bus segment 102(0)–102(4) comprises several access points 104 at which data from surrounding logic is MUXed onto the debug bus 100. As will be described in greater detail below with reference to FIGS. 3 and 4, each access point 104 comprises a standard logic block with a proprietary MUX structure that drives debug data into the access point, which subsequently drives the data onto the debug bus 100.

As illustrated in FIG. 1, two observability ports 106, 108 are defined. In one embodiment, one of the ports, i.e., port 106, is a dedicated debug port. The other port, i.e., port 108, is loaded with functional signals. The debug bus 100 contains debug data that drives both of these ports 106, 108. In one implementation, the debug port 106 has 80 data pins, plus four strobe pins that are single pumped, with the intention that the port 106 be connected directly to a logic analyzer (not shown).

As previously indicated, the debug port 106 is fed directly from the debug bus 100, which runs at core clock speed and connects the bus segments 106 in a serial ring. The debug bus 100 is segmented so that for any of a plurality of functional areas of an IC in which the bus is implemented, packets to and from the area can be observed in addition to 80 bits of internal state data. Additional details regarding implementation and operation of the debug bus 100 and ports 102, 104 are provided in commonly-assigned, copending U.S. patent application Ser. No. 10/402,034, filed Mar. 28, 2003, entitled AN INTEGRATED CIRCUIT, which has been incorporated by reference in its entirety hereinabove.

Figure 2:
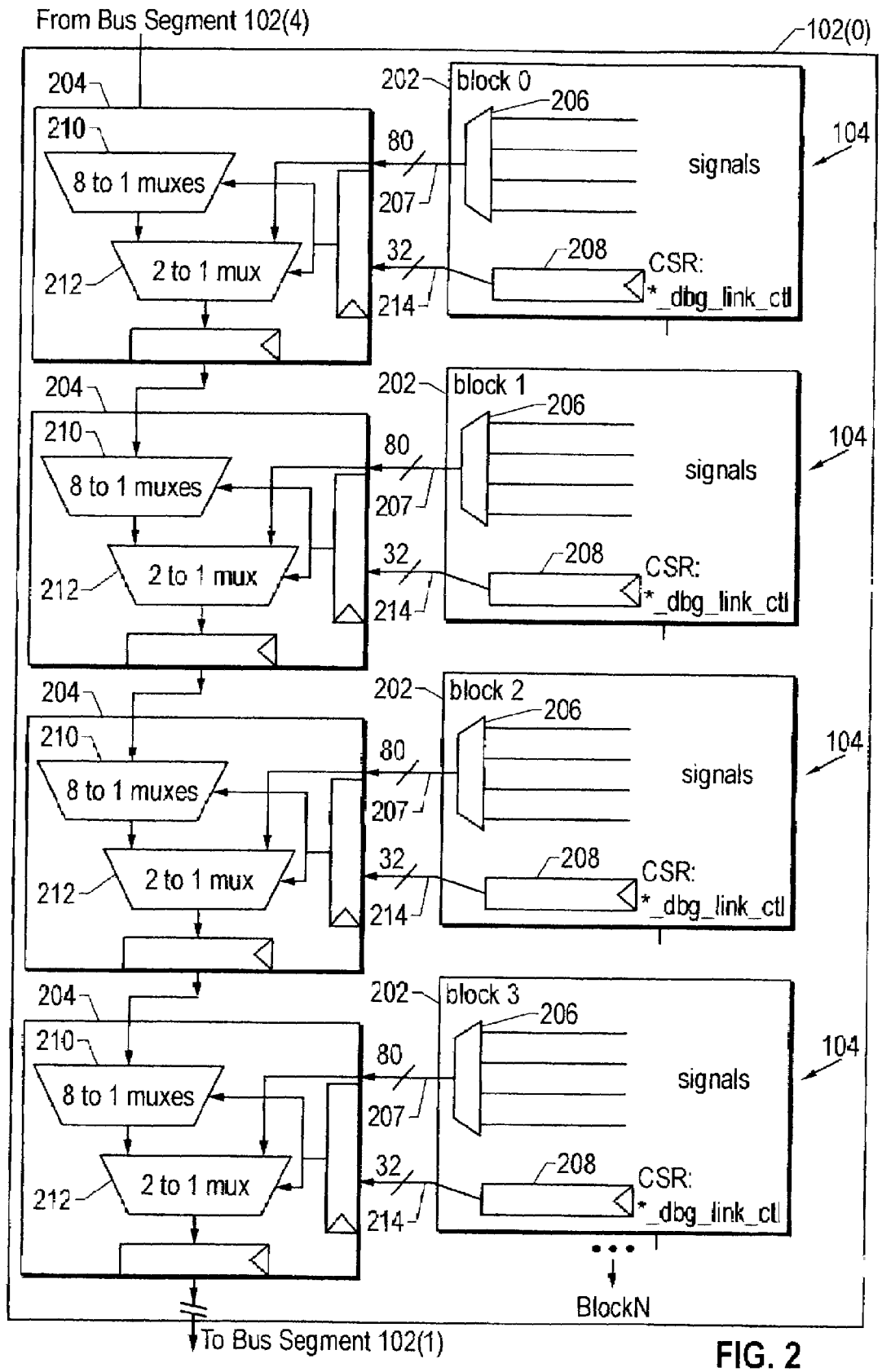
FIG. 2 is a block diagram of a bus segment of the debug bus of FIG. 1.

FIG. 2 is a more detailed block diagram of the bus segment 102(0) of the debug bus 100 illustrated in FIG. 1. As illustrated in FIG. 2, the bus segment 102(0) includes a plurality of access points 104. It should be noted that although only four access points 104 are shown, each bus segment 102(0)–102(4) may comprise greater or fewer access points as necessitated by the number of signals that must be handled by the bus segment.

As shown in FIG. 2, each access point 104 includes a local data intake section 202 and a corresponding debug bus interface block ("DBIB") 204 connected thereto. The DBIB structure may also be referred to as a logic module structure or a Bus Interface Module ("BIM") segment. At each access point 104, up to 80 bits of data from surrounding logic ("dbug_read_bus") is provided to the DBIB 204 thereof via a MUX 206 along a bus 207. A control and status register ("CSR") 208 provides a 32-bit MUX select signal ("*_dbg_link_ctl") to MUXes 210, 212 of the corresponding DBIB 204 via a bus 214 for purposes that will be described in greater detail below.

Figure 3:
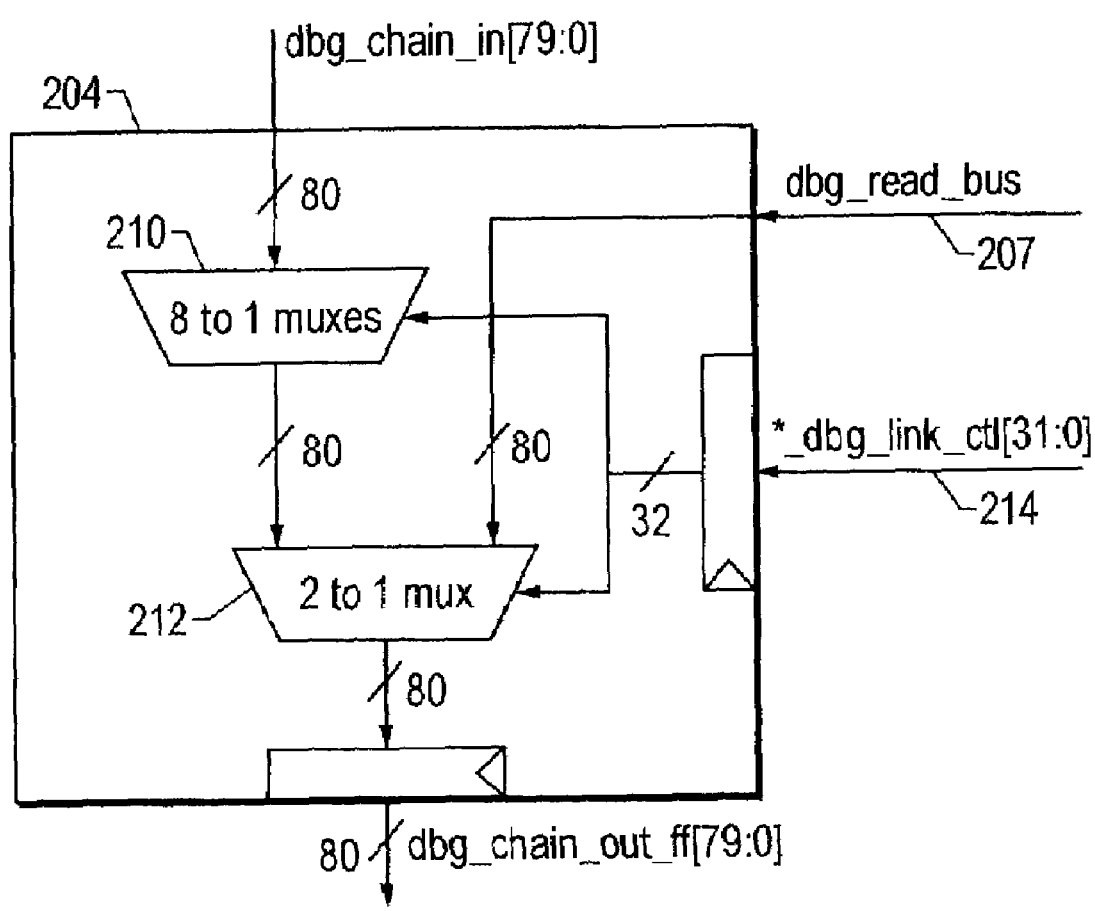
FIG. 3 is a block diagram of a standard logic block used to implement the bus segment of FIG. 2.

FIG. 3 is a more detailed block diagram of one of the DBIBs 204 of FIG. 2. In one embodiment, the debug bus 100 is logically divided into eight 10-bit blocks. Each DBIB 204 can move and/or replicate incoming debug bus data ("dbg_chain_in") from the previous DBIB in the chain in these 10-bit blocks to make room for incoming data ("dbg_read_bus") from the corresponding local data intake section 202, if necessary, and pass the newly configured data ("dbg_chain_out") to the next DBIB 204 in the chain. Generally, each DBIB 204 performs the following three functions: (1) it passes data on from the previous access point, (2) it moves 10-bit blocks of data from the previous access point to other ranges of the debug bus, allowing for more efficient bandwidth utilization; and (3) it MUXes in data from surrounding logic in 10-bit chunks.

As previously indicated, to make MUXing of data manageable, the debug bus 100 is logically divided into eight 10-bit blocks, each of which can be individually manipulated. Further, each access point 104 registers data from the previous access point, rearranges the data from previous access point in 10-bit blocks as specified by the corresponding CSR signal ("*_dbg_link_ctl"), and MUXes in local data to be passed on to the next access point.

Figure 4A:
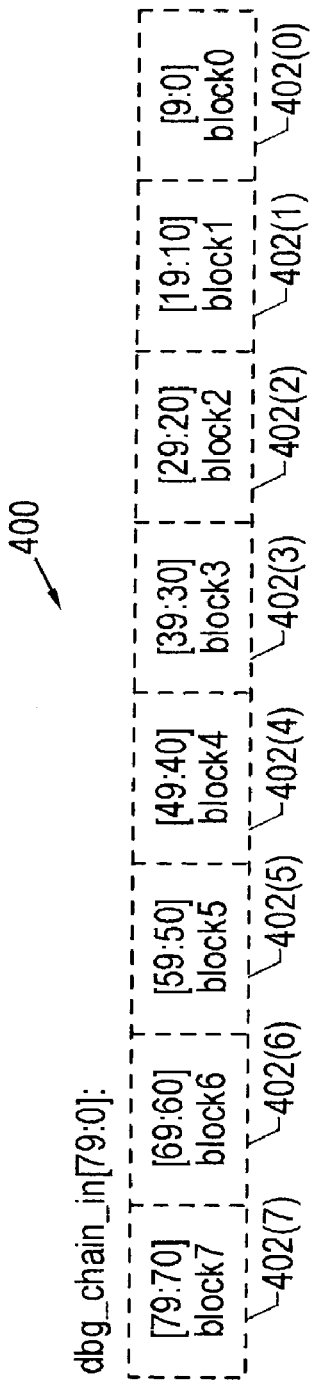
FIG. 4A illustrates the format of the dbg_chain_in signal of the debug bus of FIG. 1.
Figure 4B:
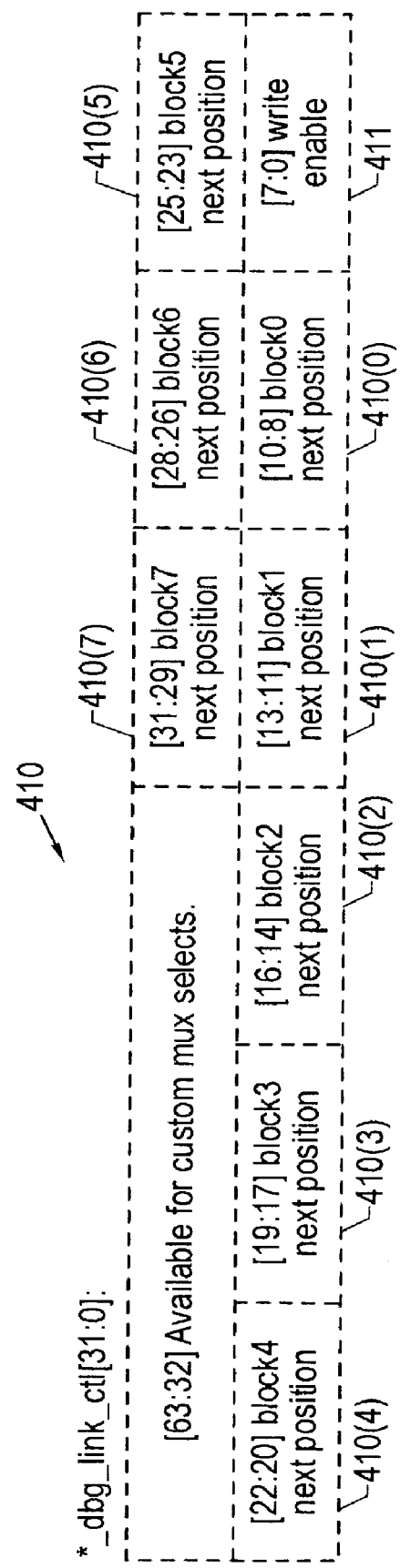
FIG. 4B illustrates the format of the *_dbg_link_ctl signal of the debug bus of FIG. 1.

FIG. 4A illustrates the format of the dbg_chain_in signal, designated in FIG. 4A by reference numeral 400. As previously described, in one embodiment, the signal 400 comprises eight 10-bit data blocks 402(0)–402(7) which can be individually manipulated as will be described in greater detail below. Although not shown, it will be recognized that the formats of the dbg_chain_out and dbg_read_bus signals are substantially identical to that of the dbg_chain_in signal 400. FIG. 4B illustrates the format of the *_dbg_link_ctl signal, designated in FIG. 4B by reference numeral 410. In one embodiment, the first eight bits of the signal 410, designated by reference numeral 411, form a write enable signal for the MUXes 210, 212. Eight three-bit fields 412(0)–412(7) are used to specify the block position of each of the eight blocks of data of the dbg_chain_in signal in the dbg_data_out chain. In particular, the contents of the field 412(0) (bits 8–10) specify the position in the dbg_chain_out signal of the first block 402(0) of the dbg_chain_in signal 400; the contents of the field 412(1) (bits 11–13) specify the position in the dbg_chain_out signal of the second block 402(1) of the dbg_chain_in signal 400; and so on.

Figure 5:
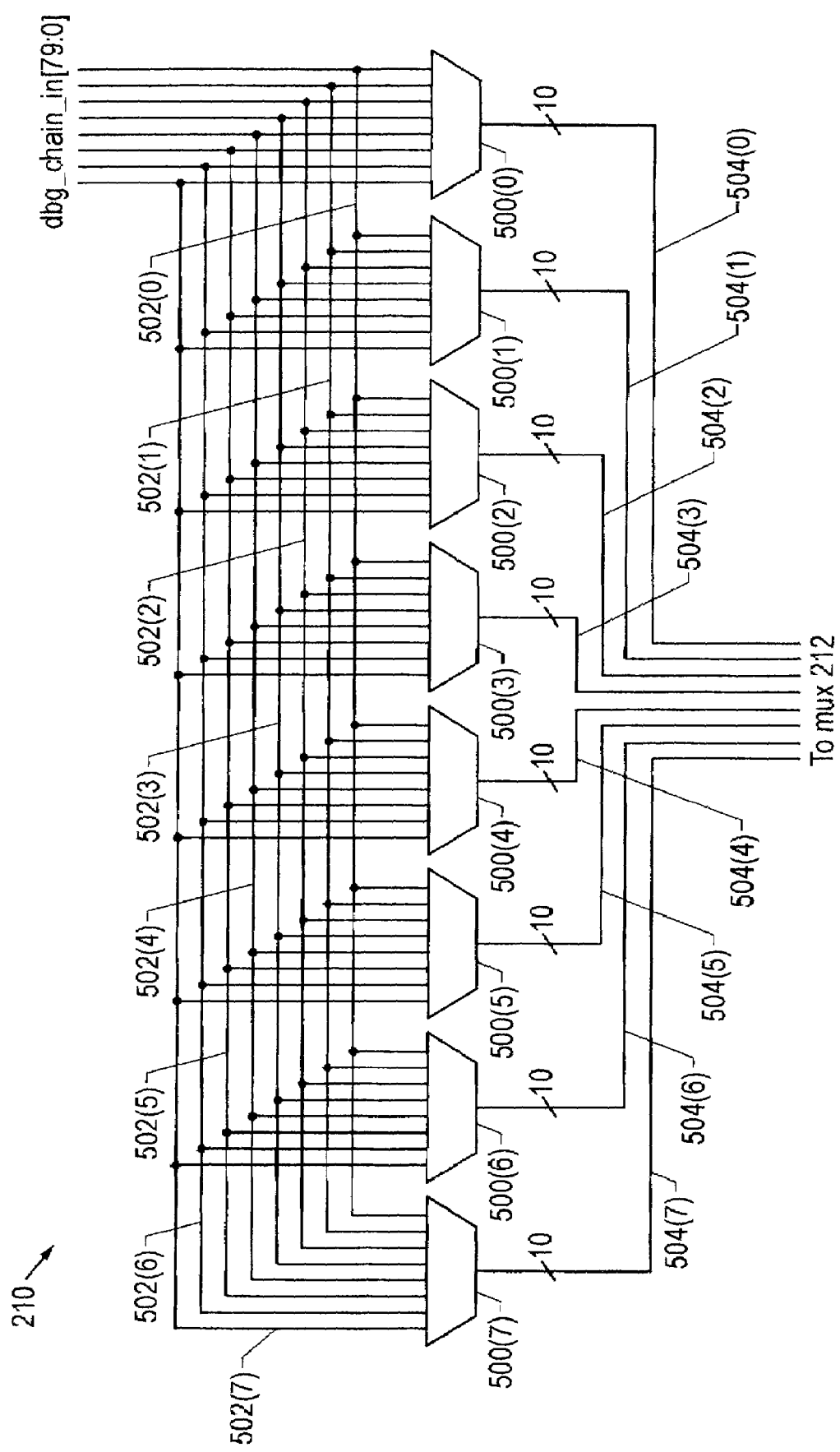
FIG. 5 is a block diagram of logic structure implemented in the standard logic block of FIG. 3 for swapping blocks of data.

FIG. 5 is a more detailed block diagram of the swap structure of the MUX 210. As illustrated in FIG. 5, data comprising each of the eight 10-bit blocks 402(0)–402(7) of the dbg_chain_in signal 400 are input via eight 10-bit wide lines 502(0)–502(7), respectively, to all of N Nx1 MUXes 500(0)–500(7). In the illustrated embodiment, the value of N is eight; however, it will be understood that the value of N will be dependent upon the width of the debug bus and the granularity with which the bus is subdivided. Each of the MUXes 500(0)–500(7) outputs via a 10-bit line 504(0)–504(7), respectively, any one of the data blocks 402(0)–402(7) input as specified by the value of the control signal *_dbg_link_ctl.

For example, the first block (block 402(0)) of the signal 400 could be shifted to the fourth block position of the dbg_chain_out signal by outputting it from the MUX 500(3). Additionally, a selected block of data may be replicated by outputting it from multiple ones of the MUXes 500(0)–500(7). In the foregoing manner, the structure illustrated in FIG. 5 enables any 10-bit block of data at the input of the MUXes 500 to be moved to any other block at the MUX outputs 502(0)–502(7) simply by selecting one or more of the MUXes 500(0)–500(7) to output that data block.

Accordingly, it will be recognized that the disclosed logic structure for moving data involves a plurality of MUXes, where the number of MUXes is equal to the width of the debug bus divided by the width of each of the data blocks. In general, the embodiment described herein defines a standardized logic block that can be used to implement data bus that is then routed to internal and external debug observability equipment. Internal equipment can be a logic analyzer intellectual property macro or equivalently any logic that processes data and can be read/controlled by software. The standardized logic block includes staging registers for timing closure and MUXes that enable data to be combined in order to allow users to extract data in compact blocks that effectively facilitate debug, performance analysis, and post-silicon test coverage. Any data can be moved anywhere else on the bus, with the caveat that data is moved with a granularity such that the MUX implementation is physically small enough to be reasonable. Advantages of the embodiments described herein include that, due to standardization, the design is easier to configure and use and fewer MUX designs mean that the proper operation of the overall embodiment is easier to verify.

An implementation of the invention described herein thus provides a bus interface module for enabling real-time observability in an IC. The embodiments shown and described have been characterized as being illustrative only; it should therefore be readily understood that various changes and modifications could be made therein without departing from the scope of the present invention as set forth in the following claims. For example, while the embodiments are described with reference to an ASIC, it will be appreciated that the embodiments may be implemented in other types of ICs, such as custom chipsets, Field Programmable Gate Arrays ("FPGAs"), programmable logic devices ("PLDs"), generic array logic ("GAL") modules, and the like. Furthermore, while the embodiments shown are implemented using CSRs, it will be appreciated that control signals may also be applied in a variety of other manners, including, for example, directly or may be applied via scan registers or Model Specific Registers ("MSRs").

Additionally, although the embodiments described herein anticipate that the data from the previous DBIB will be shifted to allow data from local logic to be placed on the bus, it will be recognized that the local debug data could be moved, e.g., using a structure such as that illustrated in FIG. 5, with the data from the previous DBIB being left as is.

Accordingly, all such modifications, extensions, variations, amendments, additions, deletions, combinations, and the like are deemed to be within the ambit of the present invention whose scope is defined solely by the claims set forth hereinbelow.

What is claimed is:

1. A bus interface module ("BIM") connectable to a debug bus comprising a plurality of bus segments connected in a ring such that an output of each BIM is connected to an input of a next BIM via the debug bus, the BIM comprising:

logic for receiving data from a previous BIM;

logic for receiving data from local logic associated with the BIM; and logic for rearranging the previous BIM data with local logic data in a chunk-by-chunk controllable manner and transmitting the rearranged data to a next BIM, wherein the data received from a previous BIM and the data received from local logic are logically subdivided into individually-manipulable data blocks, the logic for rearranging comprising logic for moving data received from the previous BIM in a first block position to a second block position, further wherein the logic for moving data comprises N N×1 multiplexors, each input of the N N×1 multiplexors operating to accept one block of the data received from a previous BIM.

2. The BIM of claim 1 wherein the logic for receiving data from a previous BIM, logic for receiving data from local logic, and logic for rearranging each comprise a plurality of multiplexers.

3. The BIM of claim 1 further comprising logic for replicating a selected block of data.

4. The BIM of claim 1 wherein the value of N is equal to the width of the debug bus divided by the width of each of the data blocks.

5. The BIM of claim 1 further comprising circuitry for providing a control signal specifying a block position of each block of data received from the previous BIM to the logic for moving data.

6. The BIM of claim 5 wherein the circuitry for providing a control signal comprises a control status register ("CSR").

7. The BIM of claim 1 further comprising logic for transmitting at least a portion of the data received from local logic in the first one of the block positions.

8. A debug bus comprising a plurality of logic modules connected in a ring such that an output of each logic module is connected to an input of a next logic module via the debug bus, each logic module comprising:

means for receiving data from a previous logic module;

means for receiving data from local logic associated with the each logic module; and means for rearranging the previous logic module data with local logic data in a chunk-by-chunk controllable manner and transmitting the rearranged data to a next logic module, wherein the data received from a previous logic module and the data received from local logic are logically subdivided into individually-manipulable data blocks, the means for rearranging comprising logic for moving data received from the previous logic module in a first block position to a second block position, further wherein the logic for moving data comprises N N×1 multiplexors, each input of the N N×1 multiplexors operating to accept one block of the data received from a previous logic module.

9. The debug bus of claim 8 wherein the means for receiving data from a previous logic module, means for receiving data from local logic, and means for rearranging each comprise a plurality of multiplexers.

10. The debug bus of claim 8 wherein each logic module further comprises means for providing a control signal specifying a block position of each of the blocks of data received from the previous logic module to the means for receiving data from a previous logic module.

11. The debug bus of claim 10 wherein the means for providing a control signal comprises a control status register ("CSR").

12. The debug bus of claim 10 wherein the debug bus is 80 bits wide and is partitioned into eight 10-bit block positions.

13. The debug bus of claim 8 wherein the value of N is equal to the width of the debug bus divided by the width of each of the data blocks.

14. The debug bus of claim 8 wherein each logic module further comprises means for replicating a selected block of data.

15. The debug bus of claim 8 wherein each logic module further comprises means for transmitting at least a portion of the data received from local logic in the first one of the block positions.

16. A method of implementing a debug bus including a plurality of logic modules connected in a ring such that an output of each logic module is connected to an input of a next logic module via the debug bus, the method comprising:

receiving, at each module, data from a previous logic module;

receiving data from local logic associated with the each logic module; and rearranging the previous logic module data with local logic data in a chunk-by-chunk controllable manner and transmitting the rearranged data to a next logic module, wherein the data received from a previous logic module and the data received from local logic are logically subdivided into individually-manipulable data blocks, the rearranging comprising moving data received from the previous logic module in a first block position to a second block position, further wherein the moving of data is effectuated by N N×1 multiplexors, each input of the N N×1 multiplexors operating to accept one block of the data received from a previous logic module.

17. The method of claim 16 wherein the receiving data from a previous logic module, receiving data from local logic, and rearranging are each performed using a plurality of multiplexers.

18. The method of claim 16 further comprising, at each logic module, providing a control signal specifying a block position of each of the blocks of data received from the previous logic module.

19. The method of claim 18 wherein the providing a control signal is implemented using a control status register ("CSR").

20. The method of claim 18 wherein the debug bus is 80 bits wide and is partitioned into eight 10-bit block positions.

21. The method of claim 16 wherein the value of N is equal to the width of the debug bus divided by the width of each of the data blocks.

22. The method of claim 16 further comprising, at each logic module, replicating a selected block of data.

23. The method of claim 16 further comprising, at each logic module, transmitting at least a portion of the data received from local logic in the first one of the block positions.

* * * * *

UNITED STATES PATENT AND TRADEMARK OFFICE
CERTIFICATE OF CORRECTION

| | | |
|---|---|---|
| PATENT NO. | : 7,146,538 B2 | Page 1 of 1 |
| APPLICATION NO. | : 10/402092 | |
| DATED | : December 5, 2006 | |
| INVENTOR(S) | : Tyler James Johnson et al. | |

It is certified that error appears in the above-identified patent and that said Letters Patent is hereby corrected as shown below:

On the Title Page Item (56), under "Foreign Patent Documents", delete "1 393 604 B1" and insert -- 1 393 504 B1 --, therefor.

Signed and Sealed this

Sixteenth Day of December, 2008

JON W. DUDAS
*Director of the United States Patent and Trademark Office*